United States Patent [19]

Allio

[11] Patent Number: 5,671,089
[45] Date of Patent: Sep. 23, 1997

[54] DEVICE FOR FORMING AN AUTOSTEREOSCOPIC IMAGE

[76] Inventor: Pierre Allio, 81, rue de la Mare, 75020 Paris, France

[21] Appl. No.: 537,833
[22] PCT Filed: Apr. 26, 1994
[86] PCT No.: PCT/FR94/00471
§ 371 Date: Jan. 11, 1996
§ 102(e) Date: Jan. 11, 1996
[87] PCT Pub. No.: WO94/25891
PCT Pub. Date: Nov. 10, 1994

[30] Foreign Application Priority Data

May 5, 1993 [FR] France ................. 93 05383

[51] Int. Cl.[6] ............ G02B 27/22; H04N 13/04; H04N 15/00; G03B 35/08
[52] U.S. Cl. ............ 359/462; 359/463; 348/49; 348/59; 354/115; 352/61
[58] Field of Search ................. 359/462, 463; 348/49, 59, 343; 354/115; 352/61

[56] References Cited

U.S. PATENT DOCUMENTS

| 1,960,011 | 5/1934 | Ives | 359/462 |
|---|---|---|---|
| 4,487,490 | 12/1984 | McKee | 352/115 |
| 4,621,897 | 11/1986 | Bonnet | 359/462 |
| 5,099,320 | 3/1992 | Allio | 348/59 |

FOREIGN PATENT DOCUMENTS

| 84998 | 8/1983 | European Pat. Off. . |
|---|---|---|
| 305274 | 3/1989 | European Pat. Off. . |
| WO83/03686 | 10/1983 | WIPO . |

OTHER PUBLICATIONS

R.L. de Montebello, "Wide–Angle Integral Photography—The Integram System", *Proceedings of the Society of Photo–Optical Instrumentation Engineers,* Three–Dimensional Imaging, vol. 120, Aug. 25–26, 1977, San Diego, California, pp. 73–91.

Patent Abstracts of Japan, JP A 60 244 943, Apr. 12, 1985, Seizaburou Kimura —vol. 10, No. 116 (P–452) Apr. 30, 1986.

*Primary Examiner*—Jon W. Henry
*Attorney, Agent, or Firm*—Bell, Seltzer, Park & Gibson, P.A.

[57] ABSTRACT

A device for forming autostereoscopic images by implementing a cylindrical lens array, the device being characterized in that it comprises in succession:

an entrance objective (L1, L2);

a lens array (20) having diverging elementary cylindrical lenses disposed substantially in the image focal plane of the entrance objective, said array having a focal length such that for an image area equal to the pitch (p) of the lenses making it up, the image of the entrance pupil of the entrance objective (L1, L2) has a nominal width equal to said pitch; and a converging transfer optical system (L3, L4) for forming an orthostereoscopic real image.

12 Claims, 1 Drawing Sheet

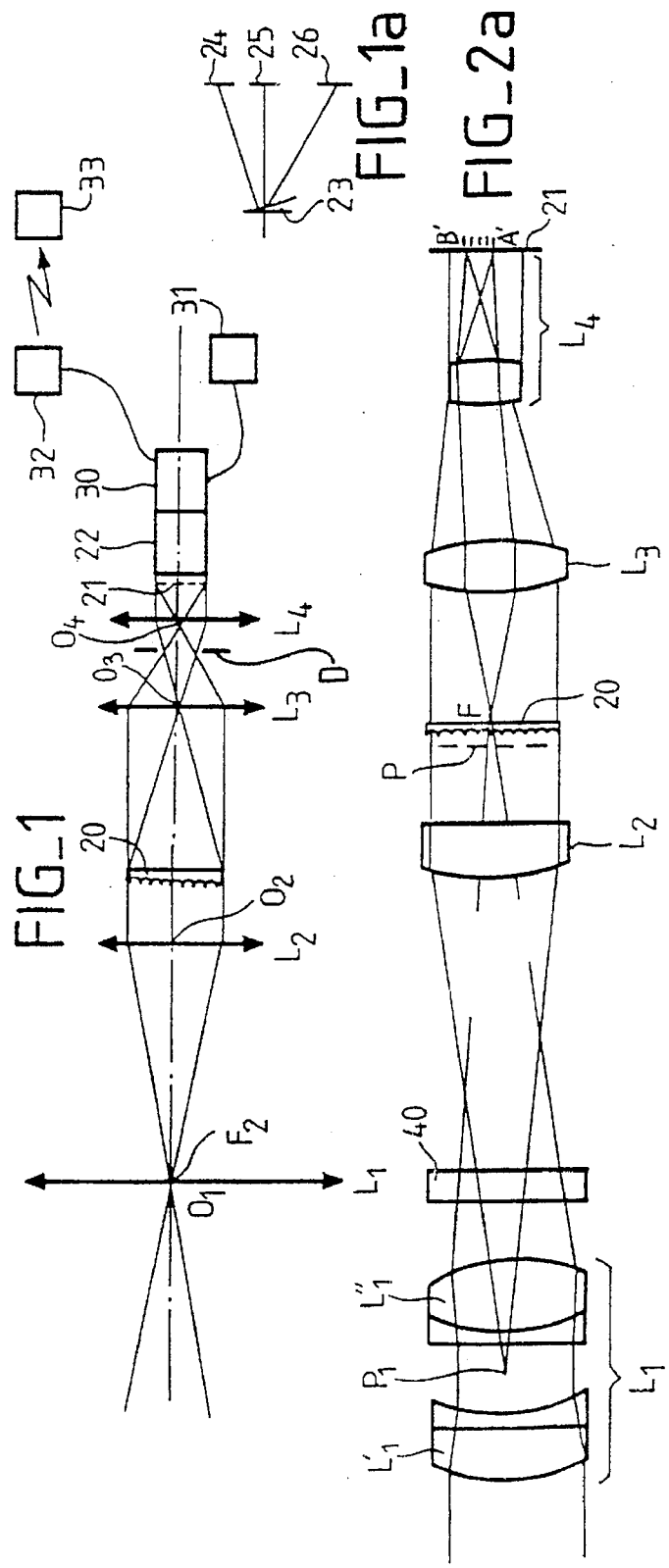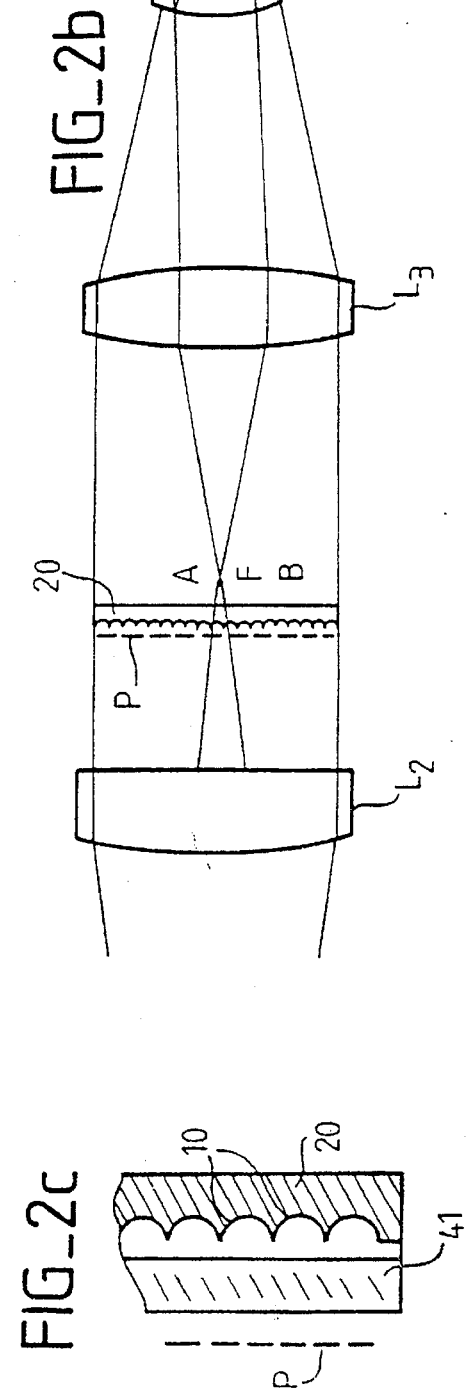

DEVICE FOR FORMING AN AUTOSTEREOSCOPIC IMAGE

The present invention relates to a device for forming autostereoscopic images by using an array of cylindrical lenses.

A device for forming autostereoscopic and orthostereoscopic images is known from European patent application EP-84598, which device comprises both a first lens array having convex lenses that form an image which is autostereoscopic and pseudostereoscopic (i.e. in "inverted relief"), and a second lens array having convex lenses which form an orthostereoscopic image.

That device suffers from the drawbacks of requiring two lens arrays, thereby giving rise to very severe constraints concerning tolerances and alignment.

European patent EP 305 274 in the name of the Applicant describes a method whereby elementary images are individually reversed about their own axes or centers of symmetry by means of an electronic process, and are recombined so as to supply an orthostereoscopic image.

The methods of the prior art for obtaining an orthostereoscopic image thus require the implementation of a system that has two stages.

The problem posed by the invention is to obtain directly an image which is autostereoscopic and orthostereoscopic.

To this end, the invention provides a device for forming autostereoscopic images by implementing a cylindrical lens array, the device being characterized in that it comprises in succession:

an entrance objective;
a lens array having diverging elementary cylindrical lenses disposed substantially in the image focal plane of the entrance objective, said array having a focal length such that for an image area equal to the pitch (p) of the lenses making it up, the image of the entrance pupil of the entrance objective has a nominal width equal to said pitch; and
a converging transfer optical system for forming an orthostereoscopic real image.

Downstream from the pupil $P_1$ of the entrance objective, and in particular between the objective and the lens array, the device may include a cylindrical element that is crossed relative to the lens array and that compensates astigmatism, at least in part. The cylindrical element may be a converging cylindrical lens having a focal length suitable for compensating said astigmatism, at least in part. In a variant, the cylindrical element may be a second diverging lens array whose focal plane coincides substantially with that of the first diverging array.

The invention also provides an image-forming device characterized in that it comprises an image sensor and in that the transfer optical system projects the rays emerging from the lens array onto the image sensor, the image of the lens array in the transfer optical system being such that the pitch of the lenses of the lens array corresponds therein to an integer number of image points (pixels) of the image sensor, and the image of the pupil of the entrance objective is situated substantially at the pupil of the transfer optical system.

The image sensor may be constituted by a charge coupled sensor, in particular constituted by a set of three individual sensors associated with a prismatic three-color beam-splitter forming images on the three sensors that are nominally aligned with one another image point by image point.

The lens array may be oriented in the direction of the lines of the image sensor. The entrance objective, which is advantageously telecentric, may include an entrance lens whose pupil is substantially equal to 100 mm. The lens array may have a pitch of 0.4 mm. The transfer optical system may have a magnification substantially equal to 0.1. It may have a circular diaphragm, in particular of the iris type.

The invention also provides an autostereoscopic video system including an image forming device as defined above.

Other characteristics and advantages appear more clearly on reading the following description, given by way of non-limiting example and with reference to the accompanying drawing, in which:

FIG. 1 and FIG. 1a shows an image forming device and system of the invention; and FIGS. 2a and 2b show a preferred embodiment of a device of the invention.

FIG. 2c shows an enlarged portion of the device of the preferred embodiment of FIGS. 2a and 2b.

FIG. 1 shows a camera device of the invention. It comprises the following elements:

1) An entrance objective that is preferably telecentric comprising an entrance lens $L_1$ and an exit lens $L_2$ whose focus $F_2$ in a telecentric system coincides with the optical center $O_1$ of the lens $L_1$. Such an entrance objective is known per se from European patent application EP-A-O 84998 (CNRS). When the optical system is telecentric, the image of the central point of the entrance pupil of the lens $L_1$ is projected to infinity by the lens $L_2$, thereby achieving parallelism that ensures the lens array is approached favorably. In particular, the two lenses $L_1$ and $L_2$ may be conjugate, i.e. the focus $F_1$ of the lens $L_1$ may also coincide with the optical center $O_2$ of the lens $L_2$. The objective $L_1$ may have a focal length of 200 mm and an aperture of f/2, for example, which corresponds to a working diameter for the pupil of 100 mm, which distance constitutes the working stereoscopic baseline for taking pictures. This value which is slightly greater than the spacing between the eyes of an observer (or inter-pupil distance, about 65 mm), is particularly favorable for obtaining realistic stereoscopic perspective after projection onto a screen.

2) A lens array having an area of about 70 mm×90 mm and made up of elementary lens 10 that are divergent, i.e. concave, which are disposed vertically at a pitch p of 0.4 mm. The lens array is disposed substantially at the focus F of the entrance objective and slightly upstream therefrom (in the light ray propagation direction). Each of the elementary lenses has a focal length such that for an image area equal to the pitch p of a microlens, i.e. of width 0.4 mm, the image of the pupil of the objective $F_1$ formed through each of the concave elementary lenses is exactly 0.4 mm. This ensures that all the virtual images of the pupil formed by each elementary lens (or microlens) touch one another exactly. It may be observed that since the array 20 is made up of cylindrical type lenses, the dimensions of the images of the pupil are naturally taken into consideration in the horizontal plane only. The diverging array 20 may be manufactured by techniques similar to those used for making converging arrays, by calendaring a plate of thermoplastic material.

3) A transfer optical system which is preferably orthoscopic, i.e. which does not induce deformations in vertical lines, and which may comprise a field lens $L_3$ positioned downstream from the lens array 20 to project all of the light rays from the array 20 towards an image transfer objective $L_4$. The objective $L_4$, e.g. having a focal length of 25 mm, is mounted on a camera 22 that is provided with charge coupled sensors. This transfer optical system $L_3$, $L_4$ transfers the virtual orthostereoscopic image formed by the lens array 20 and forms a real image 21 immediately upstream from the sensors of the camera 22. The magnification of the transfer optical system $L_3$, $L_4$ is selected so that the rays emerging from the lens array 20 are applied to the camera 22 under conditions such that the image 21 has a pitch p' corresponding to an integer number of image points (pixels) of the image sensor 22. In addition, the distance between the image 21 and the image sensor 22 is such that focusing takes place on the sensor(s) of the camera 22. The lens array 20 acts in one direction only (horizontal). A linear object having a horizontal axis and placed at infinity gives a virtual image in the focal plane P of the array 20 that is situated upstream therefrom. A linear object having a vertical axis and placed at infinity gives a real image substantially at the focus F of the entrance objective ($L_1$, $L_2$), said focus F necessarily being situated downstream from the divergent lens array 20. This gives rise to astigmatism which, in this case, interferes with focusing.

To compensate the astigmatism, it is possible to place a converging cylindrical lens 40 of long focal length e.g. downstream from the pupil $P_2$ of the entrance objective, and preferably between $L_1$ and $L_2$, the generator lines of the converging lens being horizontal (so that it is crossed relative to the lens array 20 which is disposed vertically). The focal length is designed to move towards each other and preferably to superpose the convergence point for vertical objects and the focal plane F of the diverging array.

For horizontal objects at infinity, light rays converge on the focus F and a virtual image is formed in the plane P. For vertical objects at infinity, the cylindrical lens 41 crossed with the lens array 20 has the effect that the real images thereof are formed in the plane P.

For objects placed at a given finite distance, and for exact compensation, the convergence point is situated upstream from the focal plane F.

Another solution is to place a second diverging lens array 41 practically in the same plane as the first, having the same focal length as the first, or a focal length calculated so that the two focal planes coincide, and having a pitch that corresponds to one pixel (compared with the one-fourth pitch of the first array for square pixels and four viewpoints). The pupil parameters are then fixed.

In general, the magnification of the transfer optical system is selected as a function of the size of the real image it is desired to obtain. This real image is orthostereoscopic because the virtual image produced by the diverging elementary lenses 10 does not have the inversion that is produced by the converging lenses of the prior art.

The elements of the entrance objective and of the transfer optical system are disposed in such a manner that the image of the pupil of the entrance objective coincides substantially with the pupil of the transfer optical system. When the entrance objective is not telecentric this condition serves, in particular, to ensure that the transfer optical system restores parallelism as explained below.

In particular, the sensor 22 may comprise three charge coupled sensors 24, 25, and 26 as best illustrated in FIG. 1a mounted on a prismatic three-color beam-splitter 23, which sensors are accurately aligned so that the first pixel of the first line coincides for all three sensors, and in general so that the images from the three sensors 24, 25, and 26 are thus in alignment pixel by pixel.

The signals seen by the sensor 22 integrated in a camera 30 may be applied to a television monitor 31 equipped to display stereoscopic images, or they may be transmitted via a transmitter 32 so as to be received by a receiver 33.

EXAMPLE

A lens array 20 having a pitch of 0.4 mm and a focal length of 1.66 mm was placed at 20 mm from the optical center of $L_2$ and at 90 mm from the optical center of $L_3$. The lens $L_1$ was constituted by a doublet $L'_1$, $L'_2$. Its pupil is referenced $P_1$.

$L_1$ focal length $f_1=200$ mm $L_2$ focal length $f_2=300$ mm $L_3$ focal length $f_3=230$ mm $L_4$ focal length $f_4=25$ mm distance $O_1O_2$ between the optical centers of the lenses $L_1$ and $L_2$ $O_1O_2=180$ mm distance $O_2O_3$ between the optical centers of the lenses $L_2$ and $L_3$ $O_2O_3=110$ mm distance $O_3O_4$ between the optical centers of the lenses $L_3$ and $L_4$ $O_3O_4=245$ mm.

The device is also advantageous for the following reasons.

To take a set of pictures in three dimensions, it is necessary for the system to enable a scene to be observed from different viewpoints and for the number of viewpoints to be greater than or equal to 2, with each viewpoint being far enough apart from the preceding viewpoint for there to be significant difference (or disparity) between the views. When the picture is taken using a single objective, without movement of its component elements in the plane parallel to the image plane, the entire relative offset of the picture-taking axes must be contained within the horizontal diameter of the pupil of the objective which constitutes the total available stereoscopic baseline. In the example described above, the total stereoscopic baseline, or the working horizontal diameter of the pupil, is equal to 100 mm, which is more than the inter-pupil distance of an adult human being (about 65 mm). In order to obtain a stereoscopic baseline of 10 cm with an objective that does not suffer from significant defects, and in order to ensure that the perspective of the filmed scene is not different from that perceived by an observer, it has been found experimentally that a ratio of about 2 between the focal length and the working horizontal diameter of the pupil gives the looked-for results. That is why the above-specified example uses an objective having a lens $L_1$ with a focal length of 200 mm and an aperture of f/2.

The focal length should not be considered as such since account must be taken of the dimensions of the sensitive area used. For a standard tri-CCD camera provided with sensors forming a target of about 8.8 mm×6.6 mm, the focal length defines an object field that is very narrow, indeed smaller than one-tenth of the field (about 160 mm) provided by the "standard" focal length for such an area (i.e. about 16 mm). The solution to this problem, which is how to reconcile an adequate stereoscopic baseline with a standard focal length, is to separate these two incompatible requirements by using a first intermediate image plane of greater area, e.g. ten times greater. This area is physically embodied by the lens array having a working area of 80 mm×60 mm. This image is transferred by a second objective of short focal length, e.g. 25 mm, mounted on the camera so as to cause the image formed of the array to coincide with the charge coupled sensors CCD. Once the stereoscopic baseline has performed its function in forming the image on the array of vertical cylindrical lenses, it is possible to reduce the image by transferring it in air while conserving the angle of the object field.

More particularly, implementing both the objective $L_1$ $L_2$ (which is preferably telecentric) and the transfer device $L_3$, $L_4$ makes it possible to reduce dimensions by about 10 in the above example, given that the working area of the first image plane is about 60 mm×80 mm. Since the lens array 20 is placed substantially at the first image plane of the optical system $L_1$, $L_2$, this makes it possible to retain the benefit of the 10 cm stereoscopic baseline in spite of the image format being reduced on the sensor 22. The use of an initial area of 60 mm×80 mm makes it possible simultaneously to combine the field which is a little greater than the standard focal length for this format (160 mm) and the long stereoscopic baseline which is equal to 10 cm. The signal output from the sensor 22 is directly usable because the image formed on the sensor is orthostereoscopic.

The picture taking device of the invention makes it possible firstly to use only one array 20 for all three colors and secondly for this array to be of large dimensions, thereby making it easier to manufacture and position with the desired accuracy. This avoids the drawbacks both of FIG. 1 (array of small dimensions that is difficult to position in the sensor, which in any case does not avoid the geometrical distortions intrinsic to that geometry), and of FIG. 2 (large number of lens arrays which are practically impossible to keep in alignment except under very severe experimental conditions).

In a preferred embodiment corresponding to a correction implementing a cylindrical lens 40, the second objective $L_3$, $L_4$ for transferring the image has an iris diaphragm. Such a diaphragm is equivalent to a diaphragm in the form of a horizontal slot in the first objective $L_1$, $L_2$, but it is easier to position since the only parameter is its centering. The centered iris diaphragm of the second objective is equivalent to a diaphragm in the form of a horizontal slot in the first objective. Light rays coming from the first pupil are not disturbed in the direction parallel to the axis of the microlenses, whereas in the horizontal direction these rays are definitively associated with the images of the pupil as obtained by each microlens. The images of the pupil cannot be affected by the reduction in the size of the pupil in the second objective. When the correction is performed by the second lens array 41 that is crossed with the first, the second diaphragm is effective only concerning the amount of light received, the entrance pupil being fully determined by the two arrays.

Because of the discrete nature of the sensors 24, 25, and 26 of the camera it is possible to avoid subdividing the pupil into as many sub-pupils as there are selected viewpoints. During image transfer, the image of the array 20 is positioned so that each image of each lens (or microimage of the pupil) is formed on an integer number of image points (or pixels) equal to the number of viewpoints. Because of the reversibility of light paths, the discrete nature of the sensitive surface of CCD sensors causes the first pupil of the system to be discrete in nature. The fact that the microimages of pupil No. 1 as formed at the lens array (in the manner of a continuum) are projected on a structure that is discrete both from the space point of view and also from the energy point of view makes it possible to subdivide the pupil into as many distinct geographical zones equal in number and in relative disposition to the pixels put into exact correspondence with the lenses of the array. In the above example, each image of a microlens is formed horizontally on four pixels, thereby splitting up the main pupil into four equal zones separated by portions that are made blind because they correspond to the interpixel gaps of the CCD sensors. The horizontal structure selected for the sensitive surface determines the resulting structure of the working pupil used for taking pictures in relief, and consequently determines the means for processing the resulting image. The fact of using four pixels per microlens leads to four viewpoints being filmed simultaneously (one viewpoint per sub-pupil). Electronic processing of the image becomes possible because the processing is performed on the smallest entity of the resulting composite image: the pixel, thus achieving excellent separation between the viewpoints.

Even better stereoscopic separation can be obtained by placing the lines of the sensor 22 in a direction parallel to the axis of the lenses of the lens array 20. The separation between adjacent image points belonging to different lines is greater than that between adjacent image points belonging to the same line. This corresponds to positioning at 90° relative to the usual conditions (vertical line scanning) but usual conditions can be reestablished, if so desired, by appropriate electronic processing.

I claim:

1. A device for forming autostereoscopic images by implementing a cylindrical lens array, the device comprising in succession:

a telecentric entrance objective having an image focal plane and an entrance pupil;

a lens array having diverging elementary cylindrical lenses disposed substantially in the image focal plane of the entrance objective, said lenses having a longitudinal axis, and said array having a focal length such that the image of the entrance pupil of the entrance objective has a width equal to a pitch of said lenses; and a field lens to project substantially all light rays from said array towards a converging transfer objective, said transfer objective forming an orthostereoscopic real image from said light rays.

2. A device according to claim 1, including, downstream from the entrance objective, a cylindrical element that is crossed relative to the lens array and that at least partly compensates for astigmatism.

3. A device according to claim 2, wherein the cylindrical element is a converging cylindrical lens having a focal length for at least partly compensating said astigmatism.

4. A device according to claim 2, wherein the cylindrical element is a second diverging lens array whose focal plane substantially coincides with that of the first diverging lens array.

5. A device according to claim 1 comprising a charge-coupled video image sensor for generating video images and in which the transfer optical system projects the rays emerging from the lens array onto the image sensor, the image of the lens array in the transfer objective being such that the pitch of the lenses of the lens array is equal to an integer number of image points of the image sensor, and the image of the pupil of the entrance objective is situated substantially at the pupil of the transfer objective.

6. A device according to claim 5 wherein the charge-coupled video image sensor comprises a set of three individual sensors associated with a prismatic three-color beam-splitter forming images on the three sensors that are in mutual alignment, image point by image point.

7. A device according to claim 5, wherein said image sensor has a line direction that is parallel to the lines of said video images and wherein the lens array is oriented in said line direction of said image sensor.

8. A device according to claim 1, wherein the entrance objective comprises an entrance lens whose pupil is substantially equal to 100 mm.

9. A device according to claim 1, wherein the transfer objective has a magnification substantially equal to 0.1.

10. A device according to claim 1, wherein the transfer objective has a circular diaphragm.

11. A device according to claim 1, wherein the converging transfer objective is orthoscopic.

12. An autostereoscopic video system including an image-forming device according to claim 1.

* * * * *